United States Patent [19]
Yahagi et al.

[11] Patent Number: 5,926,332
[45] Date of Patent: Jul. 20, 1999

[54] DIGITAL SOUND REPRODUCING AND EDITING DEVICE FOR RECORDING SOUND WITH FIXED EDITING POINTS

[75] Inventors: Yoshiyuki Yahagi, Kanagawa; Yukihira Maruyama, Tokyo; Masami Sato; Kaoru Sekigawa, both of Kanagawa, all of Japan

[73] Assignee: Sony Corporation, Tokyo, Japan

[21] Appl. No.: 08/928,171

[22] Filed: Sep. 12, 1997

Related U.S. Application Data

[62] Division of application No. 08/507,303, filed as application No. PCT/JP94/00339, Mar. 3, 1994, Pat. No. 5,717,534.

[30] Foreign Application Priority Data

Mar. 5, 1993 [JP] Japan ...................................... 5-45353

[51] Int. Cl.⁶ .................................................. G11B 27/02
[52] U.S. Cl. .................................. 360/13; 360/51; 386/54
[58] Field of Search ..................................... 360/13, 8, 51, 360/72.2, 73.08, 26, 48, 53; 386/95, 4, 53, 54, 64; 369/32, 54, 99; 358/425; 345/328

[56] References Cited

U.S. PATENT DOCUMENTS 5,712,737   1/1998   Tsubaki et al. ............................ 360/13

FOREIGN PATENT DOCUMENTS

| 0246661 | 11/1987 | European Pat. Off. . |
| 0361315 | 4/1990 | European Pat. Off. . |
| 0449276 | 3/1991 | European Pat. Off. . |
| 2145867 | 4/1985 | United Kingdom . |

OTHER PUBLICATIONS

Patent Abstract of Japan, vol. 014, No. 274 (P–1061), Jun. 13, 1990, JP–A–02 079262.
Patent Abstract of Japan, vol. 012, No. 180 (P–709), Dec. 16, 1987, JP–A–62 289986.
Patent Abstract of Japan, vol. 017, No. 066 (P–1484), Feb. 9, 1993, JP–A–04 274075.
Patent Abstract of Japan, vol. 016, No. 056 (p–1310), Feb. 12, 1992 JP–A–03 254455.

*Primary Examiner*—Aristotelis M. Psitos
*Assistant Examiner*—Patrick Wamsley
*Attorney, Agent, or Firm*—Jay H. Maioli

[57] ABSTRACT

A variable speed reproduction of speech from memory depending on the indication of a jog dial, is accomplished by buffer memory (23) for speech sound and a jog dial (17) for controlling a read speed from this memory. Speech sound data is read out from the buffer memory (23) at a speed corresponding to the indication of the jog dial (17). The speech sound data is reproduced, independent of the jog dial (17), from a tape (13) and is written into the memory (23). A capstan motor drive circuit (18) detects the difference between the read address and the write address of the memory (23) and controls the reproduction speed of the sound speech data from the tape (13) in accordance with this difference. Since the read speed is directly controlled for the memory (23), no time delay exists between the speed command and the actual variable-speed reproduction. The address difference between write and read of the memory (23) is always monitored to keep the buffer from becoming empty so that continuous reproduction can be made, and so that, when the speech sound is edited, variable-speed continuous reproduction can be made for speech editing by the buffer memory (23) alone.

7 Claims, 15 Drawing Sheets

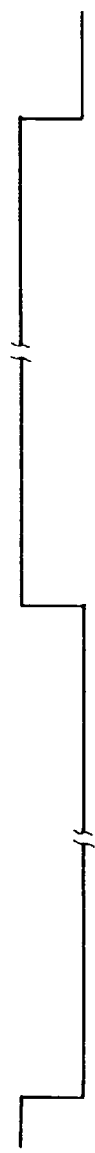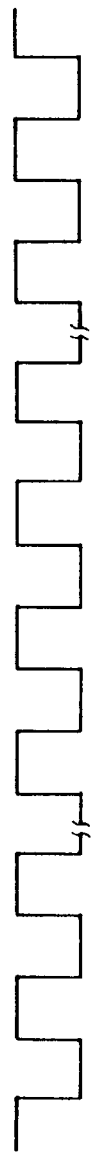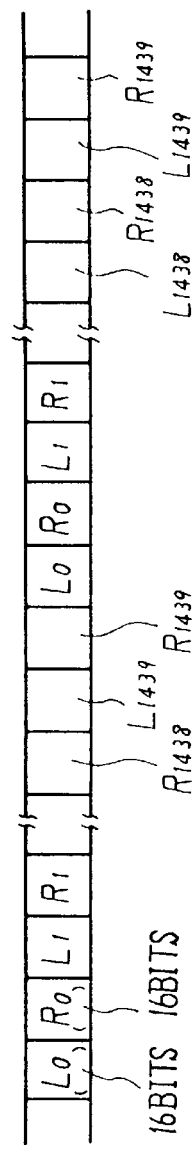
FIG.14A DAT FRAME CLOCK
FIG.14B AUDIO WORD CLOCK (48 KHz)
FIG.14C AUDIO DATA (48 KHz)

DIGITAL SOUND REPRODUCING AND EDITING DEVICE FOR RECORDING SOUND WITH FIXED EDITING POINTS

This is a division of application Ser. No. 08/507,303 filed Aug. 28, 1995, now U.S. Pat. No. 5,717,534, which is a 371 of PCT/JP94/00339, filed Mar. 3, 1994.

DESCRIPTION

1. Technical Field

The present invention relates to a digital reproducing device which can search indexes of sound to be cut out while performing variable-speed continuous memory reproduction without using an analog recording sound channel and a digital sound editing device using it.

2. Background Art

Among digital sound editing devices (which can be a digital sound recording and reproducing device) which searches indexes of necessary parts from plural music sources (sound signals) and cut out these searched music sources to edit them into a new music source, the following are known as an editing player:

(1) An editing method that sound indexes are searched using sound reproduced from an analog recording sound channel while performing variable-speed continuous reproduction using a digital sound recording and reproducing device such as a digital audio tape recorder (DAT);

(2) An editing method that a sound memory is mounted on a reproduction system of a digital sound recording and reproducing device and sound indexes are searched with variable-speed sound reproduction only in a range of memory capacity; and (3) An editing method that sound indexes are searched using sound reproduced from a digital recording sound channel in line with variable-speed continuous reproduction of image signals while performing variable-speed continuous reproduction through a jog dial using a digital recording and reproducing device provided with a DT (dynamic tracking) head.

As for the above editing method (1) that sound indexes are searched through variable-speed continuous memory reproduction using an analog recording sound channel, it requires an analog sound recording and reproducing head besides a digital sound recording and reproducing head and has a drawback that the device becomes complicated and expensive.

As for the editing method (2), the range for variable-speed reproduction is limited by the capacity of memory for sound, and if the memory capacity is increased, it takes time to take in sound data and performance is extremely deteriorated.

The editing method (3) is realized by an embodiment as shown in FIG. 16.

In an editing player 10 shown in FIG. 16, rotating recording and reproduction part 11, for example, a rotating digital VTR (video tape recorder), and a rotating drum 12 is driven with a magnetic tape 13 wound around it in a helical state. A pinch roller 14 and a capstan 15 are also illustrated in FIG. 16.

According to the speed at which a jog dial 17 is turned, a motor drive circuit 18 is controlled, and the speed of the capstan is controlled. This rotating speed is detected by an FG detection circuit 19 of a capstan motor, and a writing speed of sound data onto a sound buffer memory 23 is controlled based on and synchronously with this rotational frequency.

The FG detection output is counted at an FG counter 21, according to which a write address generation circuit 22 is controlled. The sound data is read and put out of the sound buffer memory 23. As the tape reproducing speed is changed according to the jog dial 17, indexes can be searched at a suitable speed for cutting out sound.

As the capstan motor (not shown) is a mechanical element, a time delay occurs from detection of a speed of turning the jog dial 17 to the time when the capstan motor actually reaches a predetermined speed.

In using the above digital recording and reproducing device for an editing player, image signals are synchronized with sound signals, and as an operator (editor) performs an index search while viewing a reproduced image, the time delay between the speed of turning the jog dial 17 and the variable speed of the sound is not significantly recognized.

In using a digital sound recording and reproducing device for an editing player, however, the time delay between the speed of turning the jog dial 17 to the variable speed of sound gives a sense of incongruity to the operator, which makes the editing method (3) unsatisfactory.

The present invention has solved such a conventional problem and is directed to permit variable-speed reproduction of sound data quickly following a speed control operation of the jog dial asynchronously with the writing of sound data using a sound buffer memory even if a digital sound reproducing device is used.

The present invention has another object to enable continuous variable-speed memory reproduction by controlling data writing onto the sound buffer memory so that a difference between a reading position and a writing position of the sound buffer memory is kept constant all the time.

The present invention has still another object to avoid unnecessary relative movement of a recording medium and a data pick-up system to improve durability of the device by providing a non-sensitive zone in controlling data writing onto the sound buffer memory so that a difference between a reading position and a writing position of the sound buffer memory is kept constant all the time.

The present invention has still another object to enable variable-speed memory reproduction even in the standby state of the variable-speed memory reproduction mode in switching from a high-speed running mode to a variable-speed memory reproduction mode to improve operability of the device.

DISCLOSURE OF THE INVENTION

In the present invention, sound data is written onto a sound buffer memory asynchronously with jog dial operation, and the sound data is reproduced at a variable speed synchronously with the jog dial operation. At that time, a difference between a reading position and a writing position of the sound buffer memory (that is, write address and read address) is detected, and writing of the sound data is controlled so that the difference is kept constant. Accordingly, even if the sound buffer memory is used, variable-speed memory reproduction is realized without delay from jog dial operation.

Also, in the present invention, a non-sensitive zone is provided in controlling data writing onto the sound buffer memory so that the reading position and the writing position of the sound buffer memory is kept constant all the time, and unnecessary relative movement of a recording medium and a data pick-up system is avoided. By this, durability of the device is improved.

Further, in the present invention, variable-speed memory reproduction is enabled even in the standby state of a variable-speed memory reproduction mode by performing high-speed writing onto the sound buffer memory and reading out the sound data at the speed less than this writing speed at the same time in switching from the high-speed running mode to the variable-speed memory reproduction mode. Thus, the same editing operability as an analog sound recording and reproducing device can be realized.

BRIEF DESCRIPTION OF THE DRAWINGS

FIG. 14A, FIG. 14B and FIG. 14C are timing charts showing the relation between a reproduction clock and reproduction sound data.

BEST MODE FOR CARRYING OUT THE INVENTION

The present invention will be explained in detail referring to the attached drawings.

Figure 1:
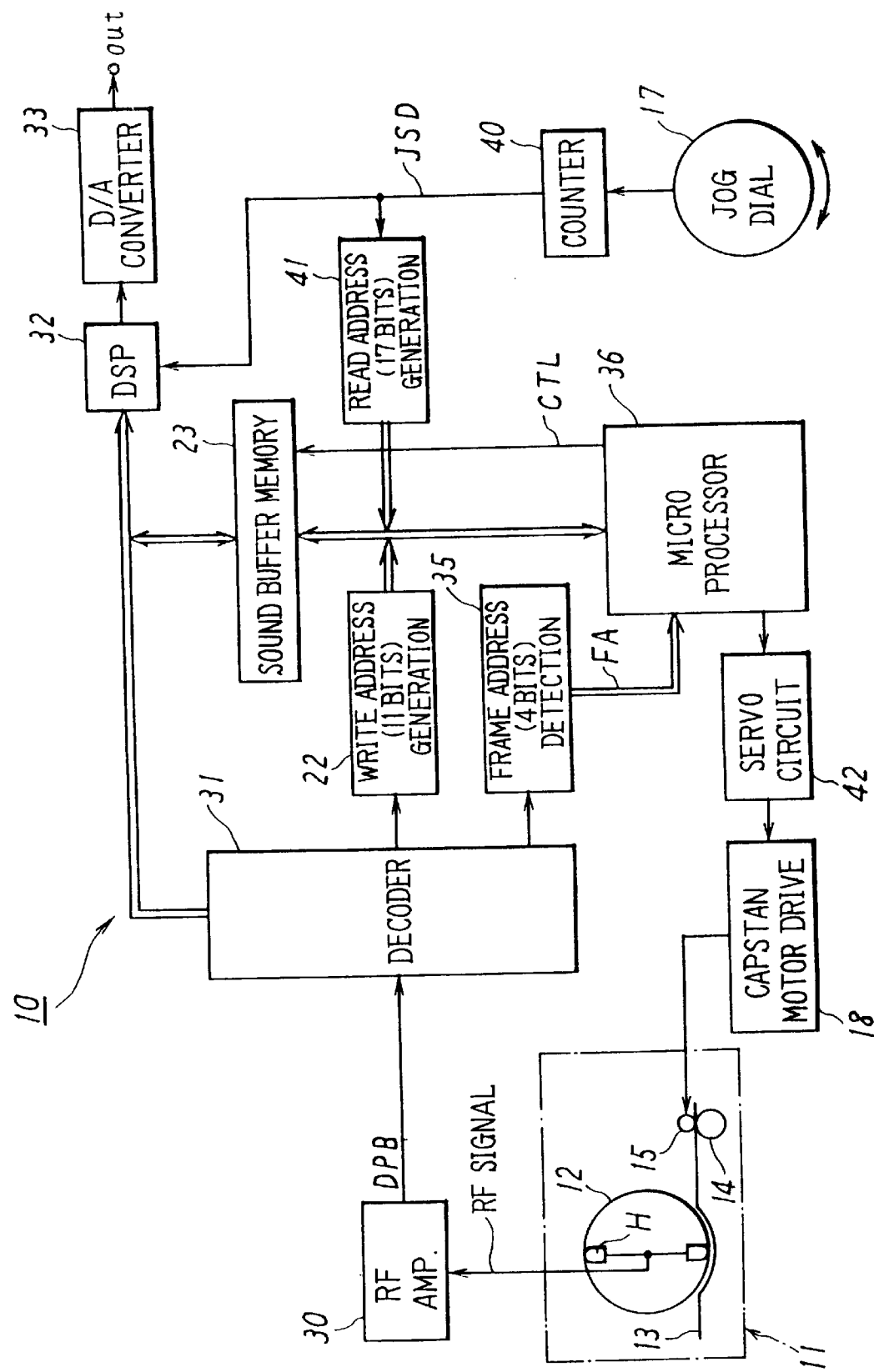
FIG. 1 and FIG. 2 are system diagrams showing an example of an editing player using a digital sound reproducing device of the present invention.
Figure 13:
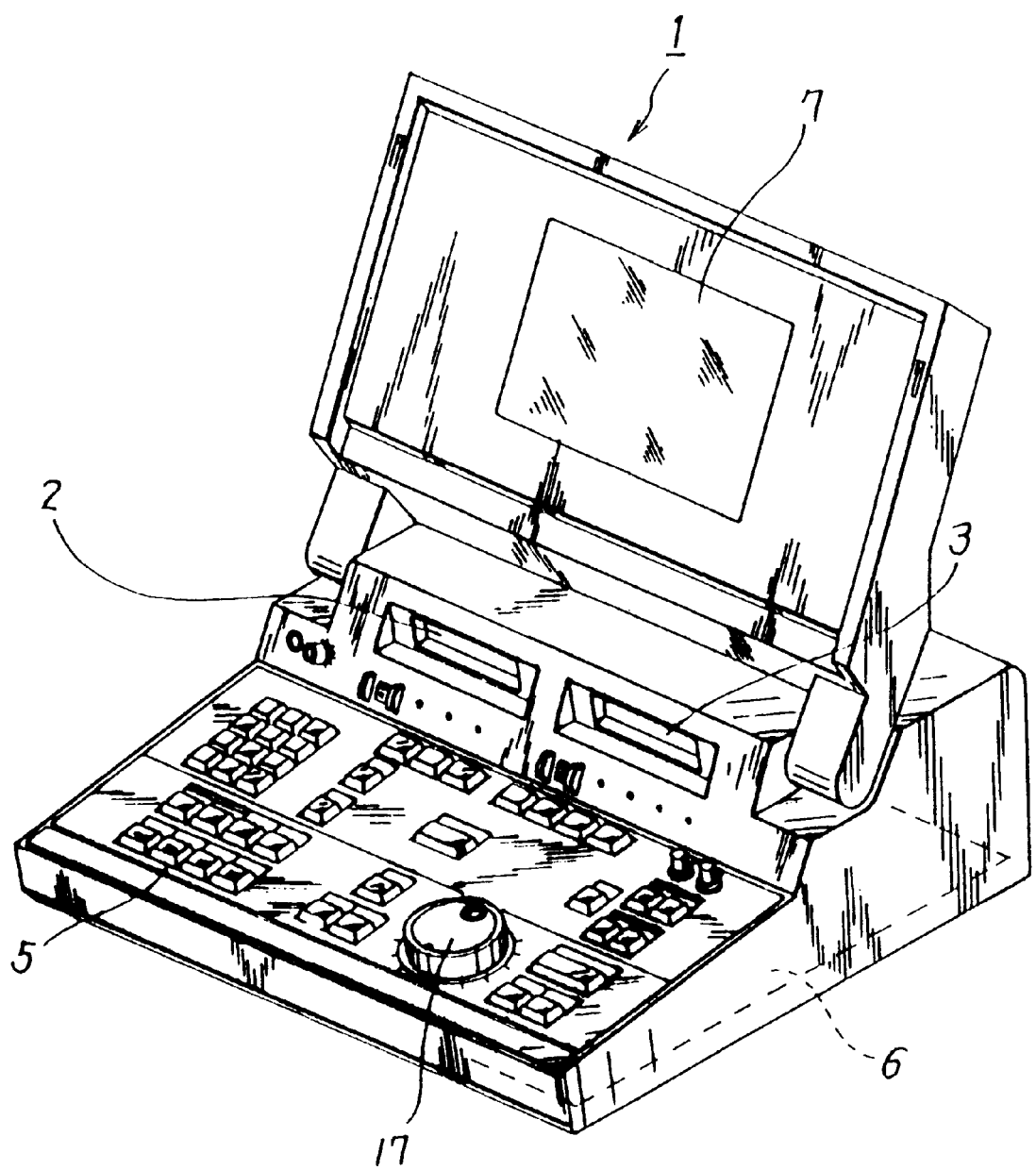
FIG. 13 is a perspective view of an editing device which can be applied to the present invention.

FIG. 1 is an example of a digital sound reproducing device (sound editing player) 10 of the present invention using R-DAT (rotating DAT). FIG. 13 is an example of a digital sound editing device using this digital sound recording and reproducing device.

A digital sound editing device 1 will be explained referring to FIG. 13. This editing device 1 is for professional use, and its reproduction part and a recording part are a dual deck type using R-DAT.

In the professional use DAT dual-deck type editing device 1 shown in FIG. 13, a DAT mechanism on the player side and a DAT mechanism on the recorder side are arranged in one housing so that music and sound recording on a DAT cassette tape can be efficiently compiled. Illustrated in FIG. 13 is a speed command operating means used for editing such as a jog dial 17, a cassette insertion slot 2 used in a player deck, and a cassette insertion slot 3 used in a recorder deck, an operation key group 5 and a substrate 6 for signal processing and control, and a display part such as an LCD.

An, index search for sound in editing work will be described briefly. An editing operator inserts a material tape into the DAT cassette insertion slot 2 on the player side and a recording tape (editing tape) into the DAT cassette insertion slot 3 on the recorder side, searches necessary parts in the material tape (index search) and repeats copying of the parts onto the editing tape to complete the editing tape.

In order to accurately determine the starting point and the end point of the necessary part on the material tape, the editing operator turns the jog dial to reproduce sound of the material continuously and at variable speed, and particularly at an extremely low speed near the point to be cut out. Such an operation to search the targeted starting point and end point on the tape is called an index search, and it is essential in editing.

In editing using an analog sound recording and reproducing device, continuous variable-speed reproduction can be easily accomplished due to its analog signals, but for a digital sound recording and reproducing device, several constitutions are employed as mentioned on conventional examples, which makes editing work too complicated.

The present invention is the technique to enable continuous variable-speed reproduction on a digital sound reproducing device, and this technique, when mounted on an editing device of the professional use DAT dual deck type, can drastically improve the editing work.

An example of the editing player 10 will be explained referring to FIG. 1.

A video tape 13 is reproduced at a pair of DAT heads H (data pick-up system) mounted on a DAT rotating drum 12, a reproduced RF signal is amplified and given waveform equalization at an RF amplifier 30 and then, converted into a digital signal DPB and sent to a decoder circuit 31.

At the decoder circuit 31, a reproduced digital signal is decoded, given error correction, deinter-leaving processing, etc. This sound data is supplied to a sound buffer memory 23 through a data bus and a synchronous clock contained in the sound data is sent to a write address generation circuit 22 and subcode information to a detection circuit 35 for recording a frame address FA.

A method for generating a write address of sound data to be written onto the sound buffer memory 23 will be explained referring to the timing charts in FIG. 14A, FIG. 14B and FIG. 14C. A DAT frame clock shown in FIG. 14A is 50/3 Hz, an audio word clock has three kinds of frequencies of 48 KHz, 44.1 KHz and 32 KHz depending on the DAT format. FIG. 14B depicts an audio word clock having a frequency of 48 KHz.

The clock in FIG. 14A is synchronized with that in FIG. 14B, and from a change point of the DAT frame clock, audio data of its frame is sent out in order synchronously with the audio word clock (FIG. 14C).

The write address generation circuit 22 counts the audio word clock from the change point of the DAT frame clock to generate the write address of the audio data in one frame. For example, when the audio word clock is 48 KHz, one frame has 1440 audio words each for L channel and R channel, and it requires the address of 11 bits.

On the other hand, the DAT frame also has an address constituted by 4 bits. In a frame address detection circuit 35, this frame address is decoded from the subcode information and sent to a micro processor 36. In this preferred embodiment, high-order 2 bits are added at the micro processor 36 to have a 6-bit frame address and generates a write address together with the previous 11-bit word address.

The audio data reproduced according to the write address so generated is written onto the sound buffer memory 23 by a write command from the micro processor 36.

In editing, the operator turns the jog dial 17 clockwise or counterclockwise at an arbitrary speed to search index while listening to a continuous variable-speed reproduction sound. The jog dial 17 contains a two-phase FG generator (not shown) for detecting the turning speed and turning direction of the jog dial, and an FG pulse generated by rotation is sent to a counter 40.

The counter 40 counts the FG pulse generated when the jog dial 17 is turned, and the result is sent to a read address generation circuit 41 and a digital signal processor (DSP) 32 as jog dial turning speed data JSD.

The read address generation circuit 41 increases/decreases the read address for the sound buffer memory 23 at a speed in proportion to the jog dial turning speed data. In this preferred embodiment, when the jog dial 17 is turned clockwise, the read address is increased as forward direction reproduction, while the read address is decreased as reverse direction reproduction when the dial 17 is turned counter-clockwise. By doing this, continuous variable-speed reproduction is enabled including forward and reverse directions of sound data using only the sound buffer memory 23.

The sound data stored in the sound buffer memory 23 is read out by a read command CTL from the micro processor 36 and sent to the DSP 32 through the data bus.

The sound data read from the sound buffer memory 23 is given interpolation processing at the DSP 32 according to the jog dial turning speed data sent from the counter 40.

For the method for interpolation, linear and other interpolations can be employed, and a simple linear interpolation will be explained referring to FIG. 15.

Figure 15:
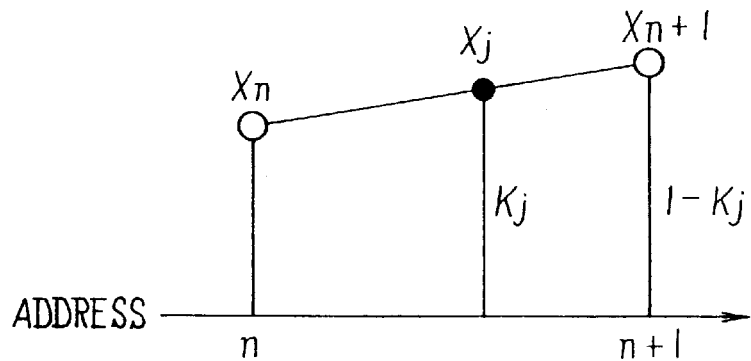
FIG. 15 is an explanatory diagram for interpolation processing.
Figure 16:
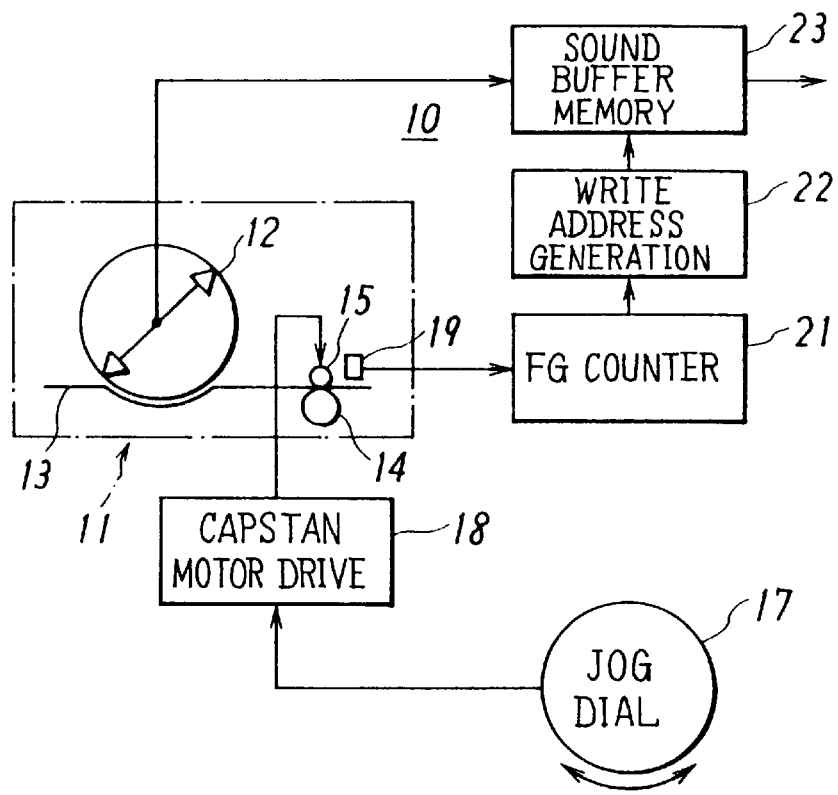
FIG. 16 is a system diagram of a conventional editing player.

As shown in FIG. 15, when the jog dial turning speed data is 1/m of normal reproduction speed (with-out interpolation), for example, the space between the sound data Xn of the "n"th read address and the sound data Xn+1 of the "n+1"th read address should be filled with (m−1) interpolation data, and the "j"th interpolation data Xj at this time can be obtained as follows:

$Xj = Kj Xn+1 + (1-Kj) Xn$ $Kj = j/m, \ j=1 \sim (m-1)$

The interpolation coefficient Kj is a value determined by the jog dial turning speed data.

The sound data which was given interpolation processing at the DSP 32 is converted to an analog sound signal at a D/A converter 33 to a continuous variable-speed reproduction sound (variable-speed memory reproduction sound). Editing is done by listening to this variable-speed reproduction sound.

In this way, by reading out the sound data directly from the sound buffer memory 23 according to the speed of turning the jog dial 17 and performing the interpolation processing at the DSP 32, a digital sound which has been variable-speed reproduced without delay from the jog dial operation can be obtained, and a sense of incongruity can be erased.

As reading and writing from the sound buffer memory 23 is asynchronous, the sound data for reading of the sound buffer memory 23 should be kept full.

Then, the micro processor 36 calculates a difference between the read address and the write address of the sound buffer memory 23, and a tape feeding speed is given to a servo circuit 42 and a capstan motor is driven by a capstan motor drive circuit 18 so that the difference is kept constant (the remainder of the sound data on the direction to be read from this point is constant).

It is so controlled that the capstan motor is driven quickly when the difference between the read address and the write address is decreasing, while it is driven slowly when the difference is increasing so that the data remainder of the sound buffer memory is kept constant, and the sound data can be continuously read out all the time with reproducing the sound buffer memory 23 at variable speed regardless of the capacity of the sound buffer memory 23.

If a DAT 11 is a model which can deal with non-tracking, the relative control between the video tape 13 and the rotating head H can be done as variable speed control of the capstan motor, and if not, it can be realized by intermittently repeating reproduction at a specific speed (2× speed, for example) and stop.

With the above constitution of the present invention, the following advantages can be gained:

(1) As variable speed reproduction including reverse direction of sound is carried out without using an analog recording sound channel, an analog sound recording and reproducing head is not necessary, which makes the device simple and inexpensive;

(2) As the sound buffer memory is used and its data remainder is detected so that the sound data is reproduced from a recording medium and written onto the sound buffer memory 23, continuous variable-speed reproduction is enabled including reverse direction of the sound and operability is improved. The sound buffer memory 23 does not need to have a large capacity, and cost of the device can be reduced; and (3) As the sound data is read directly from the sound buffer memory 23 at a speed to operate an operation mechanism, a time delay is eliminated, and editing can be accomplished without a sense of incongruity only with a digital sound reproducing device.

Figure 2:
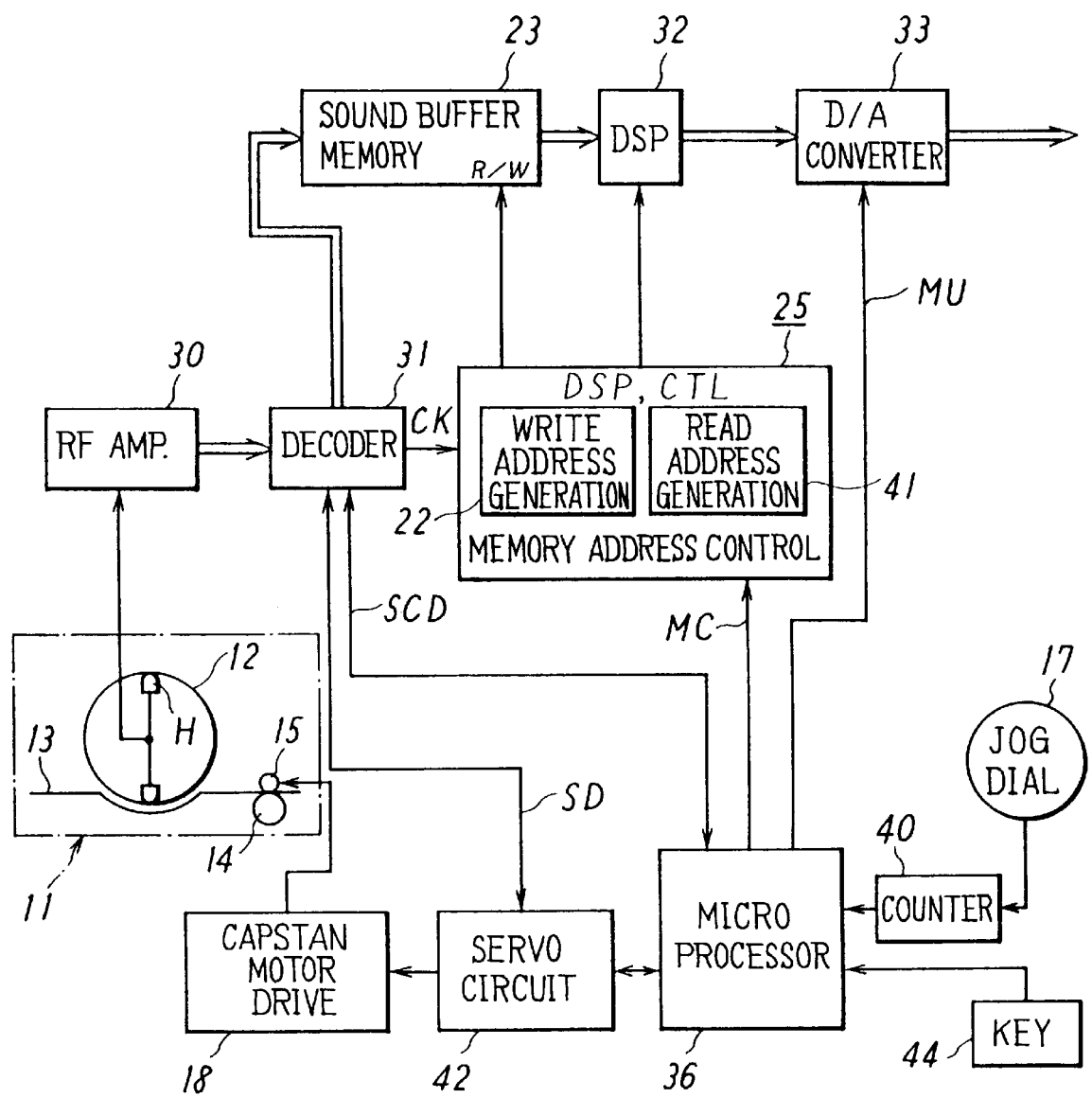

Then, another preferred embodiment of the present invention will be explained. FIG. 2 is another preferred embodiment of the present invention.

Illustrated in FIG. 2 with the same reference numerals given to the parts corresponding to those in FIG. 1 a memory address control circuit 25 including the write address generation circuit 22 and the read address generation circuit 41. The memory address control circuit 25 is supplied with various memory control signals MC by the micro processor 36.

The micro processor 36 supplies a mute signal MU to the D/A converter 33. This mute signal MU is omitted in FIG. 1. As the mute signal MU is generated at the micro processor 36, it is so constituted that the output of the counter 40 is supplied to the micro processor 36.

The micro processor 36 is provided with a transport control key group 44. It is omitted in FIG. 1. The transport control key group 44 includes a selection key for a jog mode (0~±1× speed reproduction), a selection key for a shuttle mode (0~±16× speed reproduction mode, for example), etc.

The servo circuit 42 is supplied with servo data SD from the decoder 31. A transmission path for this servo data SD is omitted in FIG. 1.

In FIG. 2, the frame address detection circuit 35 is not provided. The reason will be explained in the following.

In the preferred embodiment in FIG. 1, as mentioned above, the sound data writing address onto the sound buffer memory 23 is generated by a 6-bit frame address and an 11-bit word address.

The 6-bit frame address is the 4-bit reproduction frame address of the DAT 11 to which 2 bits are added by software. This is because the frame address information recorded in the video tape 13 has only 4 bits (repetition of 16 frames from (repetition of 16 frames from OH to FH (H is a hexadecimal notation)). The address information exceeding 16 frames is generated on the software and its address control is complicated. As the frame address is not an absolute address, if it is dislocated, sound skip or loop might occur.

Considering this point, in FIG. 2, the time information recorded in the pack of the reproduction subcode SCD of the DAT 11 is used to execute address control of reading and writing of sound data onto the sound buffer memory 23 and relative positional control of the video tape 13 and the rotating head H.

The pack of the reproduction subcode SCD defines a pack to record absolute time (Item 0010) and a pack to record running time (Item 0011). A professional use DAT records time codes in the running time. In FIG. 2, this subcode data SCD is supplied to the micro computer 36.

As all the processing is done by frame in DAT, reading and writing onto the sound buffer memory 23 is done not by bit, but by frame. At the micro processor 36, all the reading and writing onto the sound buffer memory 23 is treated by frame. The absolute address on the video tape (absolute time or time code) is also by frame as shown in FIG. 3A and calculated by frame.

Figure 3:
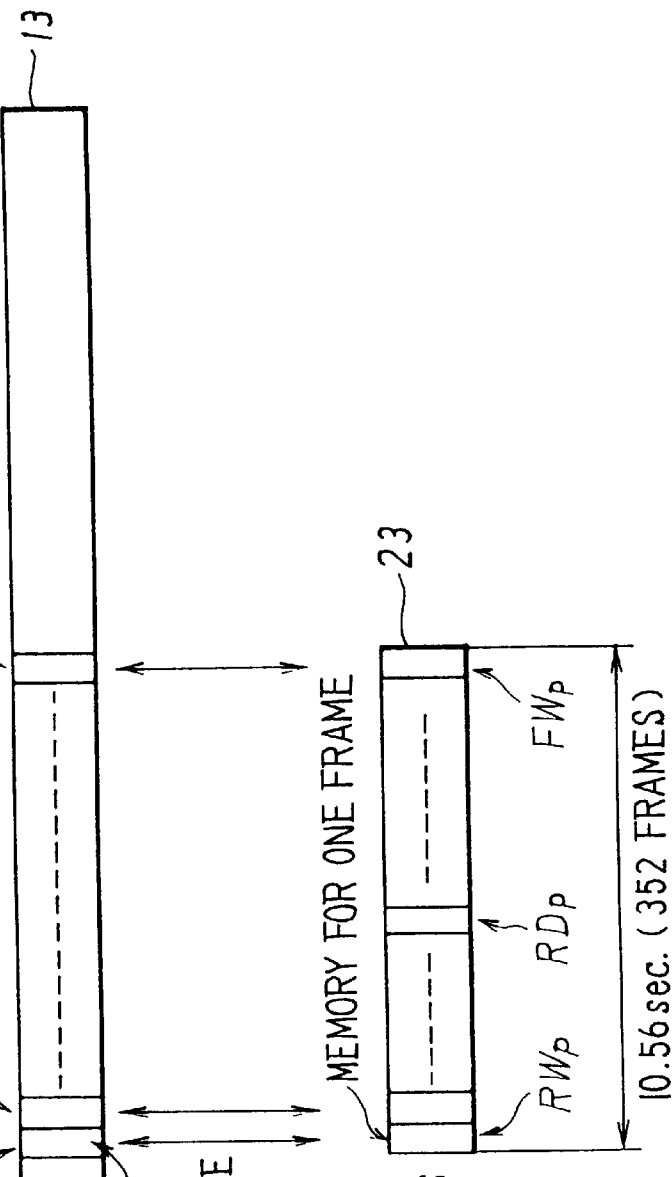
FIG. 3A and FIG. 3B are diagrams showing the relation between time information and a memory address stored in a video tape.

As a result, when the absolute frame address on the video tape 13 and the frame address on the sound buffer memory 23 are related to each other at the beginning as shown in FIG. 3A and FIG. 3B, they correspond to each other one to one, and data processing becomes simple.

As the absolute time or time code is the absolute address recorded on the video tape 13, sound slip will not occur and the address can be controlled easily.

In FIG. 3B, RDp is the read point of the sound buffer memory 23, RWp is the write point to write the sound data for the reverse direction and FWp is the write point to write the sound data for the forward direction.

At the index search in the above editing, the index point is determined by turning the jog dial 17 to the right or to the left little by little in the neighborhood where the materials are to be joined together.

In this editing embodiment, sound is searched by reading out memory, and the relative position of the video tape 13 and the rotating head H should be controlled so that the sound buffer memory 23 should not be empty by detecting a difference between the write address and the read address (data balance) of the sound buffer memory 23.

The data balance here means, as mentioned above, a data amount of the difference between the read address and the write address which is an end address on its memory in the forward direction (write end address) for the forward reproduction and a data amount of the difference between the read address and the write address which is an end address on its memory in the reverse direction for the reverse reproduction.

If the relative position of the video tape 13 and the rotating head H is always controlled in the forward direction or in the reverse direction, the frequency of movement of the video tape 13 is increased, and durability of the video tape 13 and the rotating head H can cause a problem. When the durability is to be improved, constitution of the device becomes complicated and can be expensive in many cases.

To maintain current durability, a non-sensitive zone, for example, may be provided so that the relative position of a recording medium (video tape 13) and a data pick-up system (rotating head H) should not be moved till the data balance of the sound buffer memory 23 becomes less than a certain value. Then, unnecessary operation of the data pick-up system can be eliminated.

Figure 4:
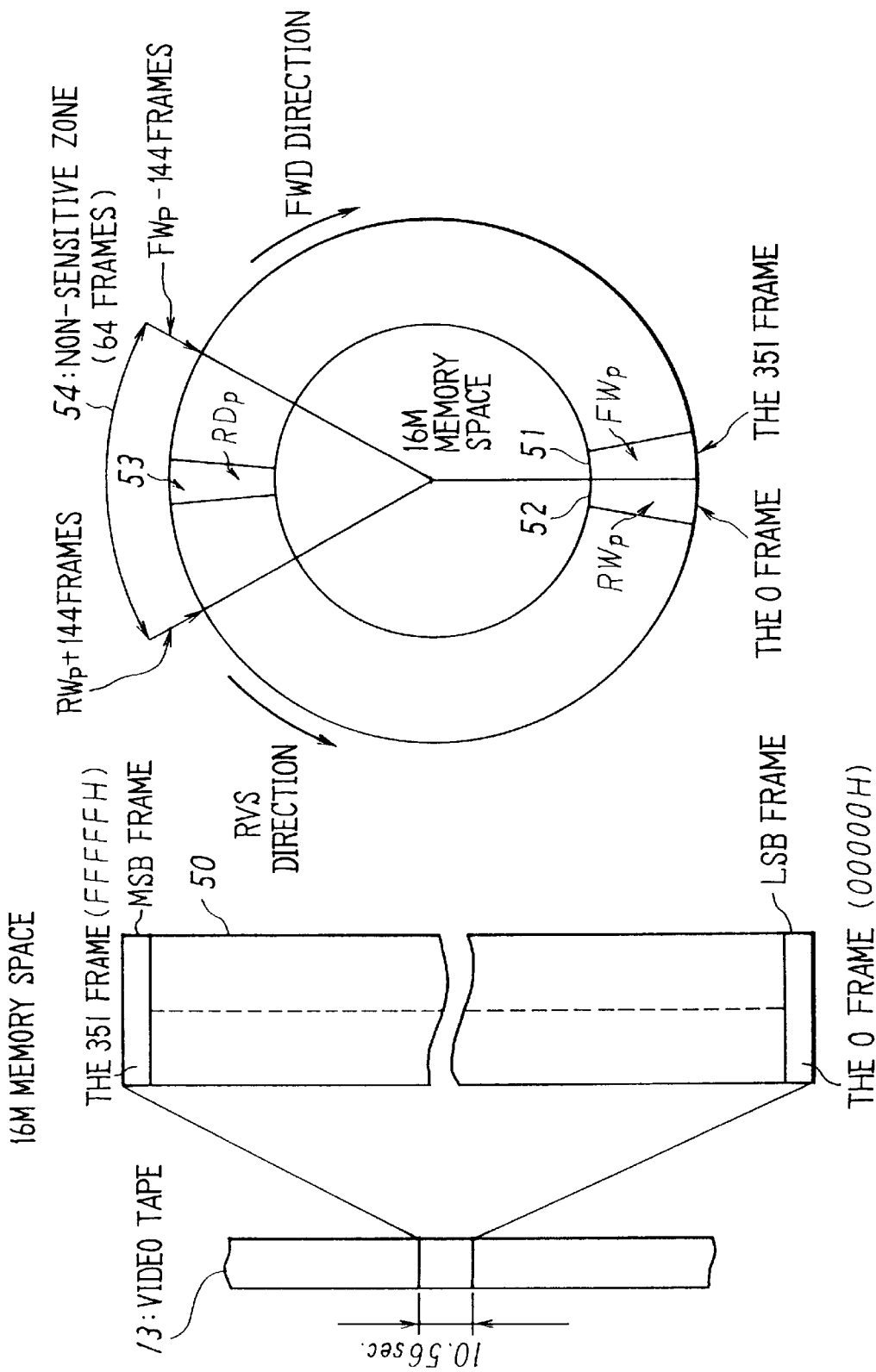
FIG. 4A and FIG. 4B are diagrams showing the relation between memory space and a ring-state address.

FIG. 4A shows an address space of the sound buffer memory 23. In this preferred embodiment, a 16M sound buffer memory is used to store 16-bit digital sound data, and a memory address space 50 is from 00000H to FFFFFH. The DAT 11 allocates them by frame from 0 to 352 frame.

When this capacity is converted to the length of sound data recorded on the video tape 13, sound of about 10.56 seconds can be written by 48 KHz sampling (Lch, Rch). In order to read out sound beyond this range, it is necessary to continuously write sound data onto the sound buffer memory 23. In this case, as the sound buffer memory 23 has only a limited capacity, the previous sound data will be lost by a newly written portion.

When this is seen from the address of the sound buffer memory 23, as the address next to the 352 frame is the 0 frame, constitution of the sound buffer memory 23 can be considered as in the ring state as shown in FIG. 4B.

In FIG. 4B, the upper limit value of the write address in the forward direction is FWp51, the upper limit value of the write address in the reverse direction is RWp52 and the read address is RDp 53. The micro processor 36 calculates a difference between the read address RDp and the write address (FWp, RWp) of the sound buffer memory 23 and executes control so that the difference is kept constant.

At this time, a zone (called as a non-sensitive zone 54) where the position of the rotating head H is not changed even if the read address RDp is changed, that is, the write upper-limit address (FWp, RWp) is not renewed to write the sound data.

In the following, a case will be explained that the upper limit address of the non-sensitive zone 54 in the forward direction is set as (FWp–144 frames) and the upper limit address of the non-sensitive zone 54 in the reverse direction as (RWp+144 frames).

FIG. 5 to FIG. 8 show operation of each transport when the sound data is read out of the sound buffer memory 23 exceeding the non-sensitive zone 54 of the memory and when read out within the non-sensitive zone 54 and switching to the jog mode.

Figure 5:
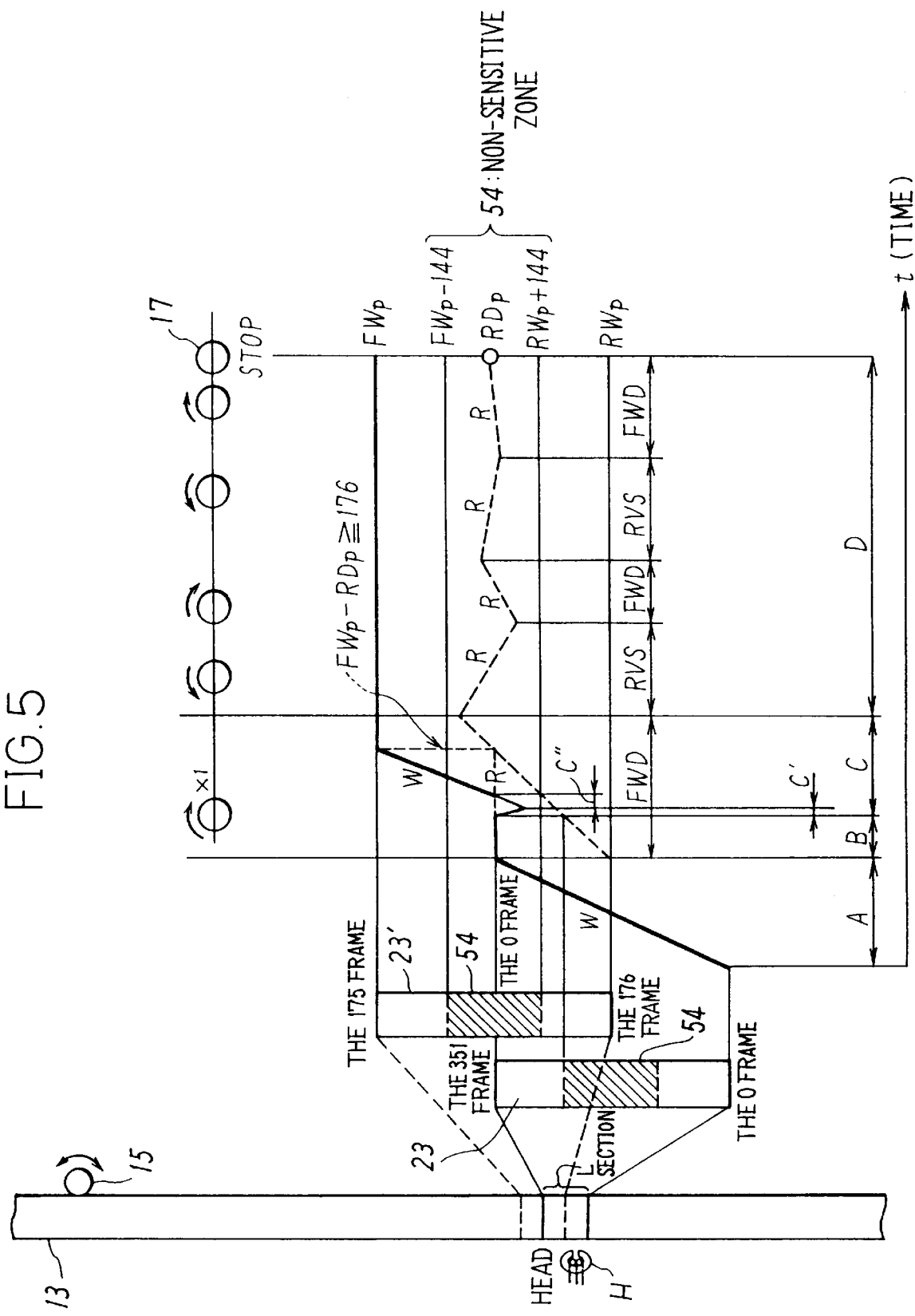
FIG. 5 to FIG. 8 are diagrams showing the relation between data reading and writing states of a sound buffer memory when a non-sensitive zone is provided.

FIG. 5 is a diagram explaining operation that writing is carried out on the sound buffer memory 23 with reproduction in the forward direction and after the sound buffer memory 23 becomes full, the jog reproduction is performed in the forward direction beyond the non-sensitive zone 54.

A section A is the section where the rotating head H reads the sound data in an L section of the video tape 13 and takes it into the sound buffer memory 23. A writing start address onto the sound buffer memory 23 in this section A is the 0 frame and an end address is the 351 frame.

When writing onto the sound buffer memory 23 is completed, the capstan motor is stopped.

An initial data taking-in onto the sound buffer memory 23 is completed at the end of the section A, and continuous variable-speed readout of sound by the jog dial 17 becomes available.

Next, a section B-C is the operation section where an index is searched by turning the jog dial 17 clockwise (forward direction) while listening to sound. The read address RDp in this section is set just at the center of the sound buffer memory 23, and it is increased according to the speed to turn the jog dial 17. The speed to turn the jog dial 17 in FIG. 5 is fixed at 1× speed of the maximum speed for simplicity.

The read address RDp in the section B is increasing, but the non-sensitive zone 54 is provided till the (FWp–144) frame is exceeded, and the capstan motor is kept stopped and the relative position of the video tape 13 and the rotating head H is not changed.

However, in a section C, as the read address RDp exceeds the (FWp–144) frame, the capstan motor 15 starts rotation, the relative position of the video tape 13 and the rotating head H is changed and sound data begins to be written onto the sound buffer memory 23. At this time, newly written sound data (bold line zone in the section C) begins at the write address 0 frame, and it changes the write upper-limit address (FWp, RWp). The address of the non-sensitive zone 54 is also changed. In the example in FIG. 5, as writing is performed up to the 176 frame for the write upper-limit address FWp as shown by 23', the address of the non-sensitive zone 54 is from the 32 frame to the 321 frame.

A section C' is the operation to read out sound data written on the video tape 13 and to add the read-out sound data continuously to the data written at the end of the sound buffer memory 23. In rewriting of data, first, movement is made 60 frames before the last written data (data of FWp) at a high speed (5× speed in the reverse direction in this preferred embodiment), and then, reproduction is started at 2× speed in the forward direction. A section C" is a servo lock period.

The reason for this audio operation is that it takes about one second from the start of reproduction till the servo is locked and right sound data can be read out in case of DAT, and that it is necessary to start reproduction before the position of the last written data on the tape.

However, the servo lock processing is a necessary operation because reproduction is made with ATF servo on. Thus, if a reproduction method with non-tracking is employed, such an operation is not necessary. In this case, reproduction can be started immediately after the high-speed movement to the position of the last written data on the tape. This reproduced data should only be added continuously to the last written data of the sound buffer memory 23.

Section D is an index-search operation section to accurately determine the position when slowly turning the jog dial 17 clockwise (FWD) and counter-clockwise (RVS).

Turning of the jog dial 17 increases/decreases the read address RDp, but it is within the address range of the non-sensitive zone 54, and the capstan motor 15 is kept stopped and the relative position of the video tape 13 and the rotating head H is not changed.

That is, in this section D, variable speed reading is carried out, but new sound data is not written. The presence of this non-sensitive zone 54 eliminates unnecessary mechanical movements and improves durability.

Figure 9:
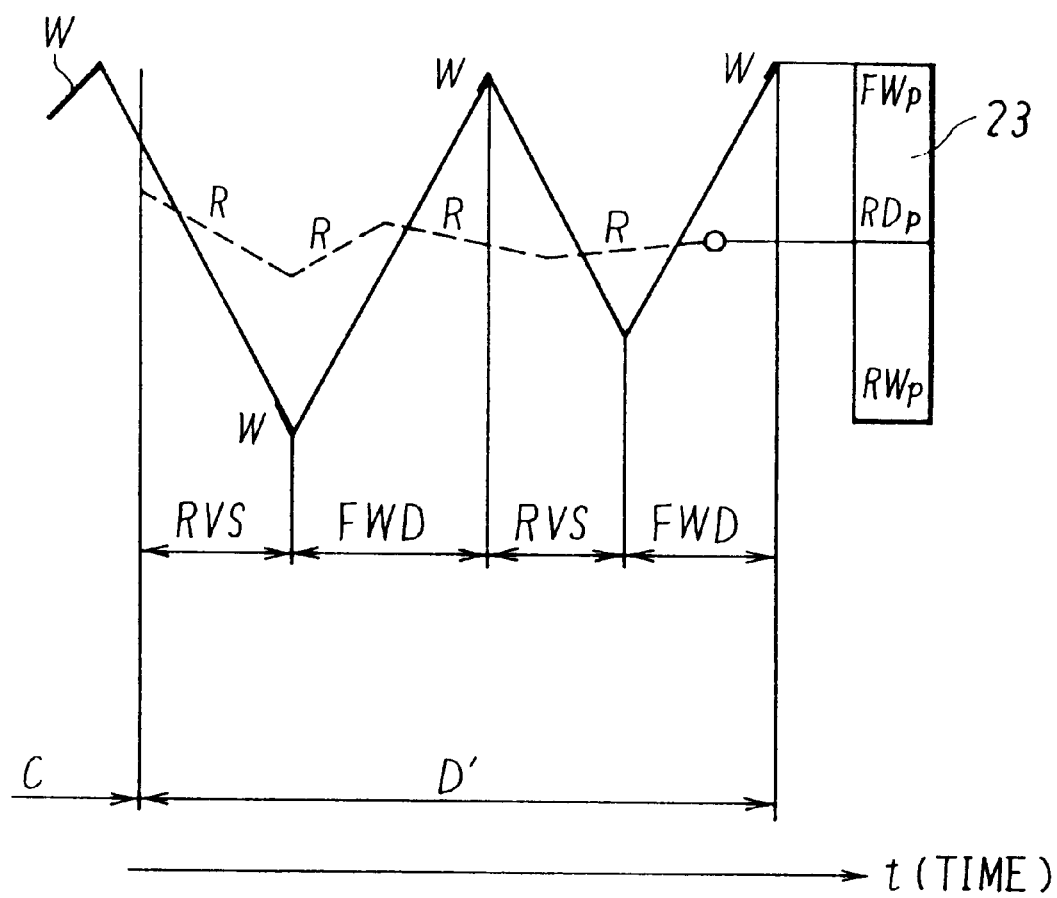
FIG. 9 is a diagram showing the relation between the data reading and writing states of the sound buffer memory when the non-sensitive zone is not provided.

An example of control without a non-sensitive zone is shown in FIG. 9 for reference.

As can be seen from a D' section corresponding to the section D in FIG. 5, in order to keep the read address RDp and the write upper-limit address (FWp, RWp) constant, the rotating head H should repeat movement incessantly to read out sound data from the video tape 13.

In the preferred embodiment, the sound buffer memory 23 has with 16M used, but other capacities can also be used. The (FWp−144) frame was chosen for the upper-limit address of the non-sensitive zone 54 in the forward direction, and the (RWp+144) frame for the upper-limit address of the non-sensitive zone 54 in the reverse direction, but other values can also be chosen.

Figure 6:
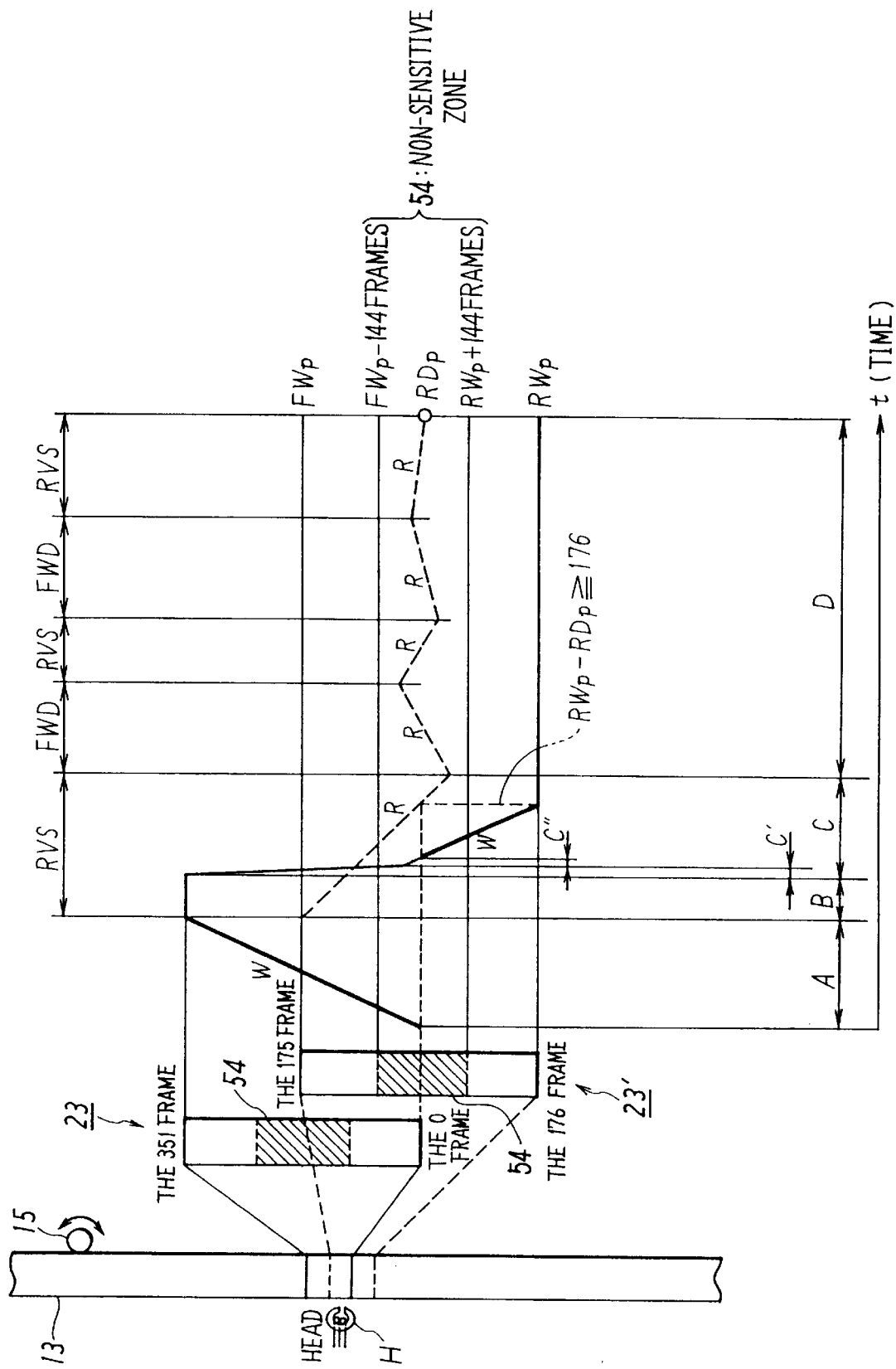

FIG. 6 is an explanatory diagram of the operation that forward reproduction is made as in the FIG. 5 and writing is performed onto the sound buffer memory 23 and after the sound buffer memory 23 becomes full, the jog reproduction is made exceeding the non-sensitive zone in the reverse direction.

When data is read out exceeding the non-sensitive zone 54 in the reverse direction, the mode is changed to the write mode in the reverse direction, and the newly written frame relations become 23'.

Figure 7:
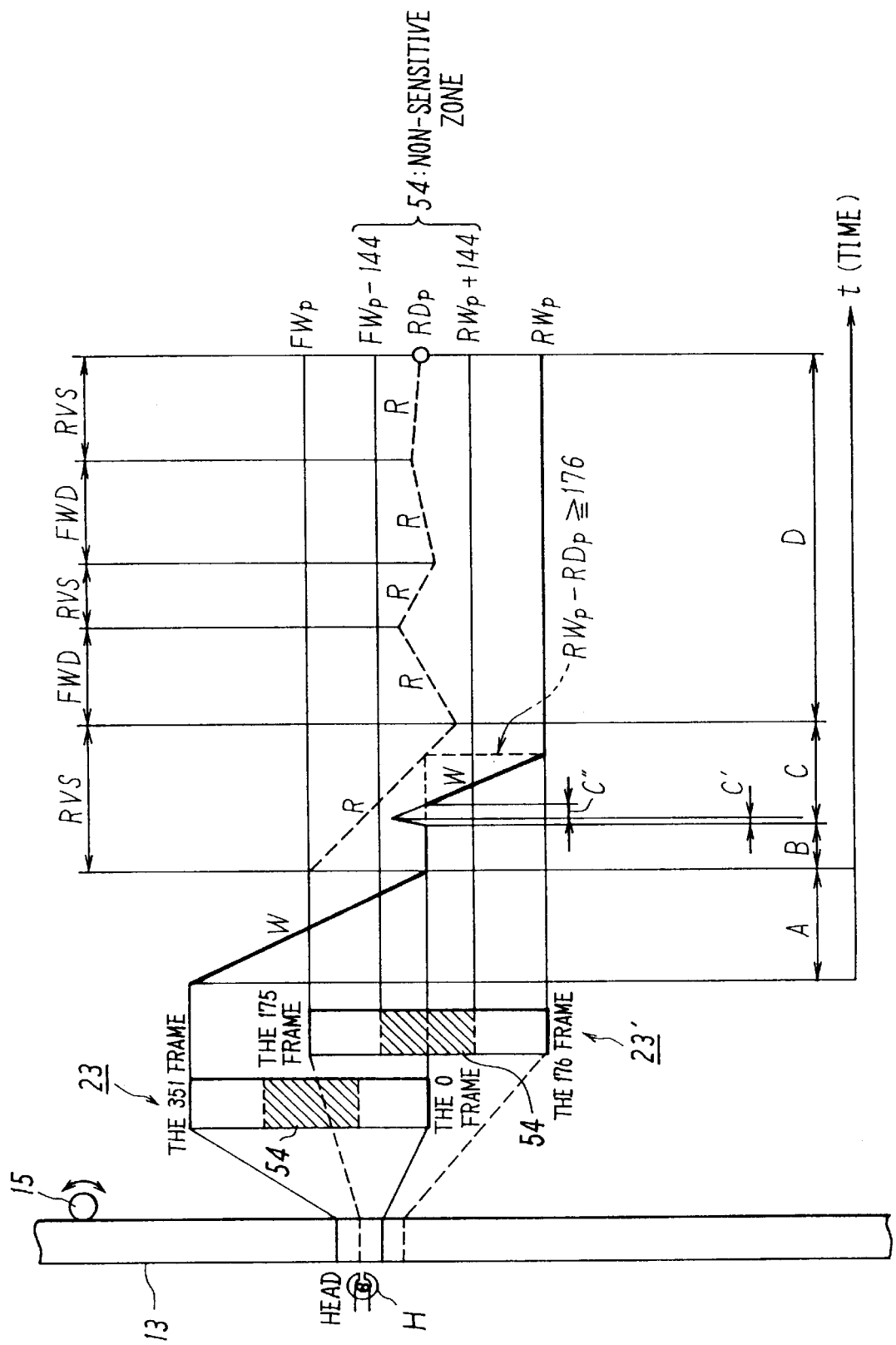

FIG. 7 is an explanatory diagram of the operation that the reproduction is made in the reverse direction, contrary to FIG. 5 and FIG. 6, and writing is performed onto the sound buffer memory 23 and after the sound buffer memory 23 becomes full, the jog reproduction is made in the reverse direction exceeding the non-sensitive zone 54.

Figure 8:
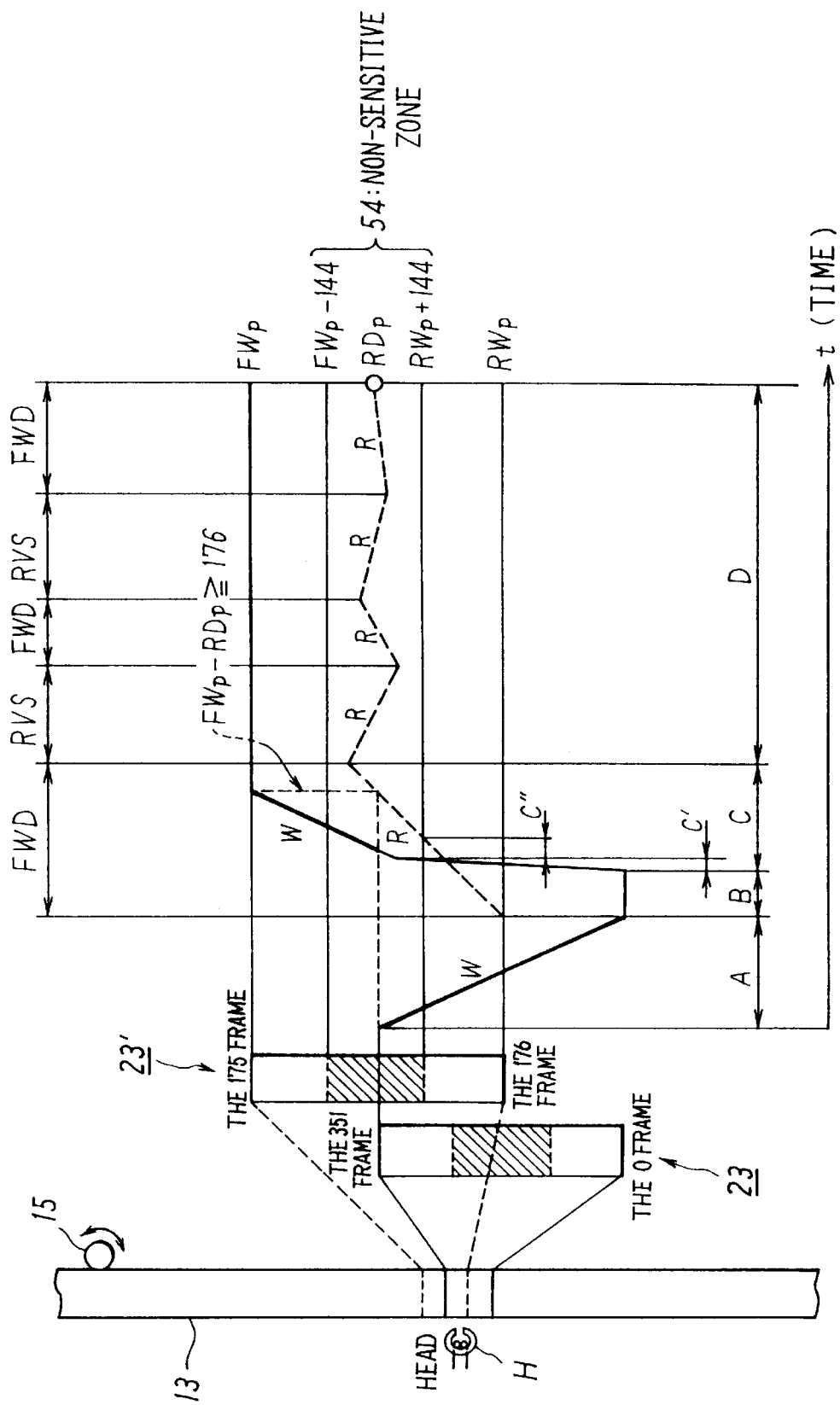

FIG. 8 is an explanatory diagram of the operation that the reproduction is also made in the reverse direction and writing is performed onto the sound buffer memory 23 and after the sound buffer memory 23 becomes full, the jog reproduction is made exceeding the non-sensitive zone 54 in the forward direction.

In the explanations on the operations from FIG. 5 to FIG. 8, whether the first taking-in should be made in the forward direction (FWD) or in the reverse direction (RVS) depends on the state of transport at switching to the jog reproduction.

For example, when a jog key is pressed in the fast forward (FF) mode, the tape 13 is fed in the forward direction at a high speed. In this case, this forward running may be continued while data is taken in. Thus, the operation is that in FIG. 5 or FIG. 6.

When the jog key is pressed in the rewinding (REW) mode, the tape 13 is fed in the REW direction at a high speed. In this case, this reverse running may be continued while data is taken in. Thus, the operation is that in FIG. 7 or FIG. 8.

There are many other transitions from various states, but data may be taken in for the running direction when the jog key is pressed.

Figure 10:
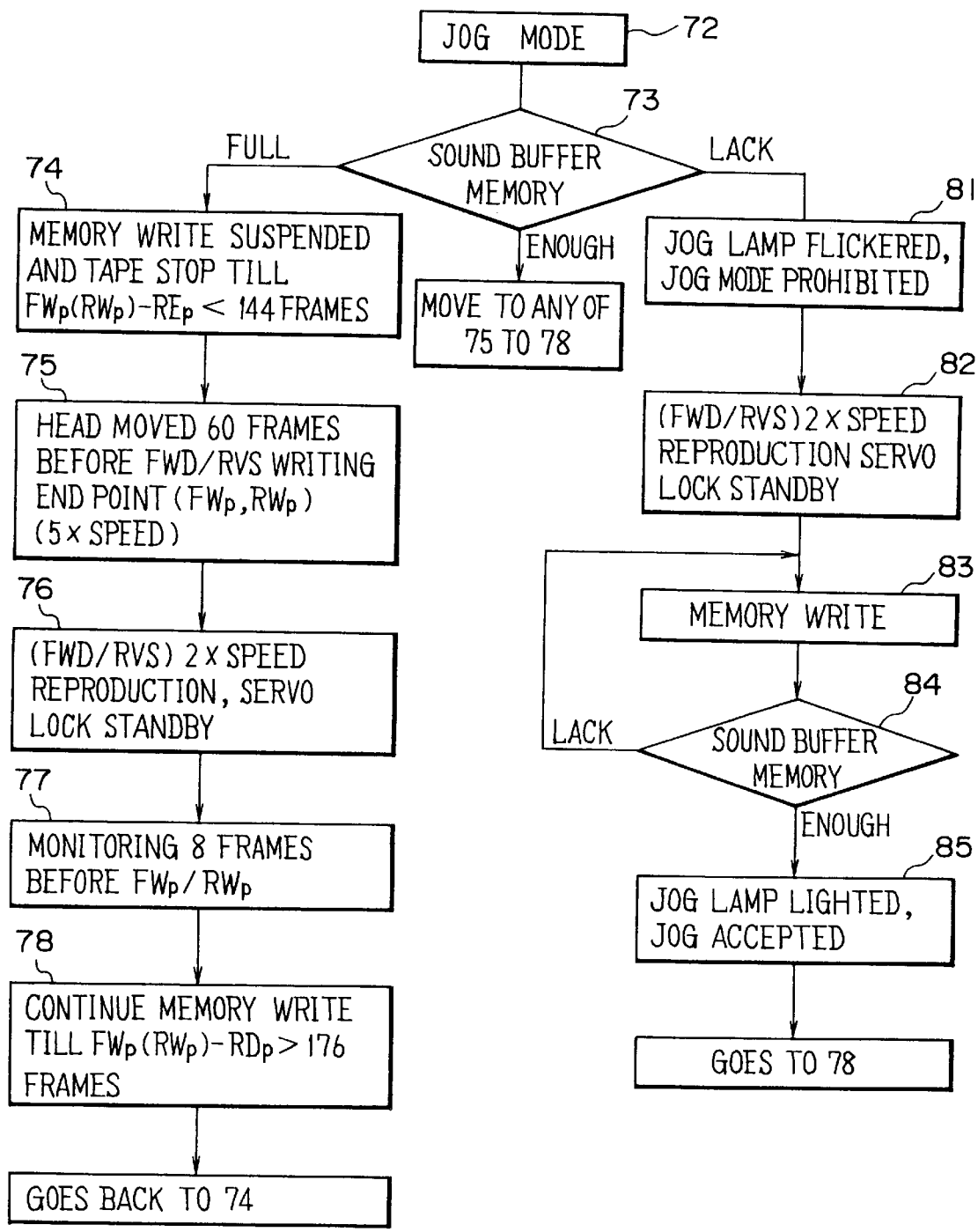
FIG. 10 and FIG. 11 are control flow charts when the non-sensitive zone is provided.

FIG. 10 shows an example of a memory control flow when the non-sensitive zone 54 is provided.

In this control flow, the mode is changed to the jog mode when the jog key is pressed (Step 72). In the jog mode, it is judged whether the sound data before and after the RD point accumulated in the sound buffer memory 23 is large enough to enable jog reproduction (Step 73).

The state of the sound buffer memory 23 is determined by the state of the transport before the jog key is pressed. For example, if it is in a play mode, the sound data should be accumulated enough and this sound data can be used as effective data.

In the case of the fast forward or rewind mode, as the sound data on the last RD point is far from the reproduced sound data on the video tape 13, even if the data is accumulated enough, this memory data can not be treated as effective sound data in many cases.

Thus, if effective memory before and after the RD point is full (FULL) at Step 73, the program goes to Step 74 as jog reproduction can be started immediately.

Even if effective memory is not full, the program goes to any of Step 75 to 78 when jog reproduction is in the state capable of being started. That is because it is only necessary to add new sound data while reading out sound data.

Here, "FULL" means the state where effective sound data is accumulated in the whole area of the sound buffer memory 23, while the "enough" is the state where the effective sound data is accumulated in such capacity that jog reproduction can be started without a problem, though not in the whole area of the sound buffer memory 23.

The jog reproduction is accepted before the "FULL" state so that an operator will not feel that the waiting time is so long, and writing onto the sound buffer memory 23 in this state continues till the condition at Step 78 is met.

When data reading exceeds the non-sensitive zone 54, the program goes to Step 75 and the position of the rotating head H against the tape 13 is moved 60 frames before the write position in the forward or the reverse direction at 5× speed. After that, reproduction is made at 2× speed till the servo is locked (Step 76).

The Step 75 to move the head 60 frames before the write position is a step necessary to add data, and the head is moved 60 frames before the tape position where the sound data to be written is recorded. For example, when the non-sensitive zone 54 is exceeded in the jog reproduction in the forward direction, the position is 60 frames before the write point FWp. When, on the other hand, the non-sensitive zone 54 is exceeded in the jog reproduction in the reverse direction, the position is 60 frames before the read point RWp.

Reproduction is started at 60 frames before the write position in the forward or the reverse direction because it takes about one second till the servo is locked, as mentioned above.

The 2× speed reproduction is to reduce the writing time onto the sound buffer memory 23. Thus, the rotating drum 12 is also rotated at 4000 rpm.

Next, reproduction time code is monitored at Step 77, and at the position of 8 frames before the writing start position in the forward or the reverse direc-tion writing onto the sound buffer memory 23 is started (Step 78).

This length of 8 frames is one example and this 8-frame portion is over-written, but as the portion has the same data, the sound data is written continuously.

Writing of the sound data is continued till the difference between the write point FWp and the read point RDp becomes a half of the whole capacity (176 frames in this example). The speed of data readout which is performed at the same time with writing is determined by measuring a speed instructed by the jog dial 17 in the flow chart shown in FIG. 11 (Steps 87, 88 and 89).

When a data written amount exceeds the half of the whole capacity, the program goes back to Step 74, and writing is suspended till the difference becomes less than 144 frames in this example. The transport moves to the still mode state (mode in which the video tape 13 is stopped while the pinch roller 14 is pressed down).

The difference between 176 frames and 144 frames (=32 frames) is the non-sensitive zone area. This is about one second in the forward or the reverse direction.

When the difference becomes smaller than 144 frames, the program goes to Step 75, and the above mentioned operation is repeated. This repetition enables variable-speed continuous reproduction exceeding the memory range.

When it is judged that effective data is lacking (including no data) at Step 73, as there is no sound data to be read out, the program can not go to the jog mode immediately. Therefore, a jog lamp is flickered at Step 81 to indicate that acceptance of the jog mode is prohibited. And after the servo lock with 2× speed reproduction, the program moves to the writing mode onto the sound buffer memory 23 (Steps 82 and 83).

When effective data has been sufficiently written, the jog lamp lights to indicate that the program has moved to the jog mode (Steps 84 and 85). After that, the program goes to Step 78.

Figure 11:
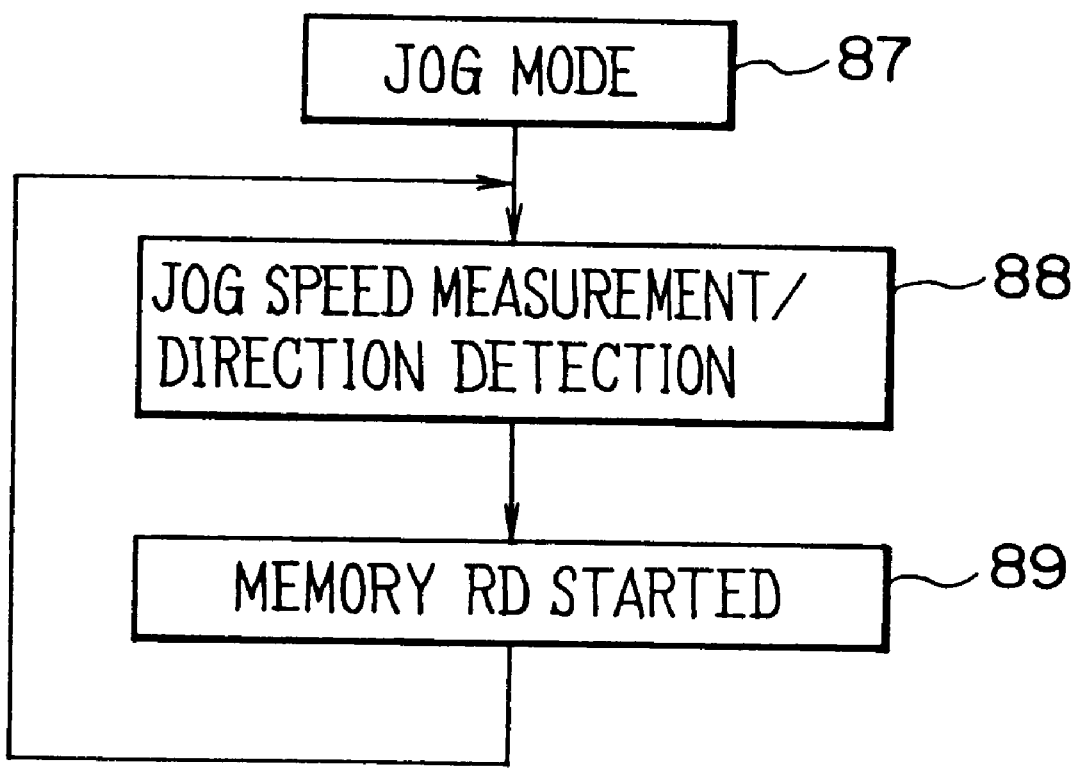

As illustrated in FIG. 10 and FIG. 11, reading can be performed at a variable speed according to the speed to turn the jog dial 17, and this is also independent of the writing mode.

By the way, it is possible to employ a control method (first control method) that at switching from the high-speed running mode to the memory variable-speed reproduction in the above mentioned FIG. 1 and FIG. 2, after having reached the reproduction speed at which data can be written onto the sound buffer memory 23, sound data is not read out till writing onto the sound buffer memory 23 is completed.

However, with this first control method, sound can not be generated at switching from the high-speed mode to the variable speed reproduction. Thus, sound data immediately before stop can not be checked.

As mentioned above, when data is written onto the sound buffer memory 23 at 2× speed in the case where the sound buffer memory 23 can accumulate sound for about 10 seconds, a silent state continues for about 5 seconds after switching to the memory variable-speed reproduction mode. Therefore, silent waiting time while taking in memory is long, and operability is worse than that of an analog sound recording and reproducing device.

These problems can be solved by employing a second control method that sound can be generated at a variable speed at switching from the high-speed mode to the variable-speed memory reproduction.

With this second control method, at switching from the high-speed mode to the memory jog reproduction mode or shuttle reproduction mode, sound data is reproduced from a recording medium before the mode switch and writing is started onto the sound buffer memory 23. At the same time, sound data may be read out of the sound buffer memory 23 at a speed less than the writing speed.

Figure 12:
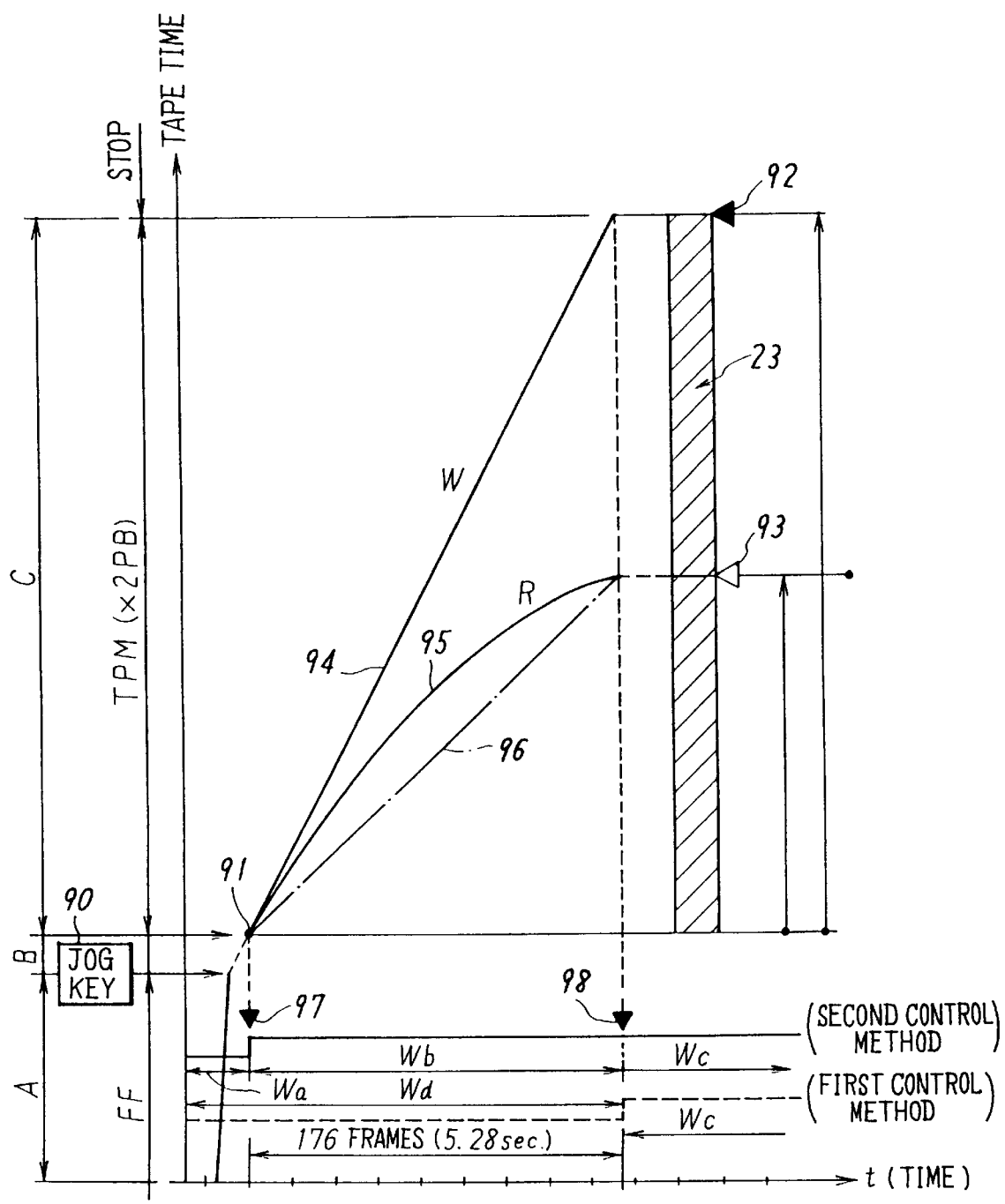
FIG. 12 is a diagram showing the reading and writing states of the sound buffer memory at a transition to a variable-speed memory reproduction mode.

The second control method will be explained referring to FIG. 12. FIG. 12 shows a control state of reading and writing onto the sound buffer memory 23. The axis of abscissa is for time and the axis of ordinate is for tape time, that is, a position on the tape.

In FIG. 12, a point 90 is the time and position on the tape that the jog key of the transport control is pressed. A point 91 is a reading and writing start point onto the sound buffer memory 23, and a point 92 is a writing end point onto the sound buffer memory 23.

A point 93 is a reading end point from the sound buffer memory 23, a straight line 94 is a writing speed onto the sound buffer memory 23. A point 97 is a output start point of analog sound and a point 98 is a memory jog acceptance start point.

In FIG. 12, the operator press an FF button among the transport control keys to fast-forward the tape. The micro processor 36 instructs a fast forward command to the servo circuit 42 and rotates a capstan motor 15 at a high speed. Since sound can not be generated in the FF mode, the micro processor 36 sends out a mute signal MU to the D/A converter 33 to have a sound mute state (section A).

Next, near the destination, the operator presses the jog button to search index while listening to the sound around it (point 90).

In order to enable switching to the memory jog mode, the micro processor 36 first controls the transport to a 2× speed reproduction mode TPM. When transport is slowed down (section B) and the servo is locked in the 2× speed repro-duction mode, writing is started onto the sound buffer memory 23 (point 91). The writing is made at a constant speed as shown by the straight line 94. After that, data writing onto the sound buffer memory is continued till the memory capacity becomes full (section C).

In the meantime, at the position shown by the point 91, reading from the sound buffer memory is started at the same time as the start of writing. The read out digital audio data is interpolated at the DSP 32 and returned to analog sound by the D/A converter 33.

Through control from the micro processor 36, the speed of reading from the sound buffer memory 23 is reduced gradually as shown by a curve 95, for example. At this time, it is so controlled that the point where the reading from the sound buffer memory 23 is finally stopped (point 93) is just at the center of the point where the capacity of the sound buffer memory 23 becomes full (point 92), and the mode is set to be switched to the memory jog mode at this point of time (point 98).

By setting so, immediately after the operator starts turning the jog dial 17, it is possible to switch to the variable-speed continuous memory jog mode.

Thus, with the second control method, a section Wa where the FF mode is changed to the 2× speed reproduction mode in FIG. 12 is muted, a section Wb from the point 97 where the 2× speed mode starts to the point 98 generates memory reproduction sound whose reproduction speed is gradually reduced, and a section Wc from the point 98 generates a memory jog sound. By the way, with the first control method, a section Wd from the FF mode to the jog mode start point shown by the point 98 is controlled in the completely muted state.

The speed of reading from the sound buffer memory 23 is started at 2× speed, but it is not limited to this speed. The interpolation according to the reading speed is carried out at the DSP 32, but it is not necessary to do interpolation also for the case of reading at a constant speed.

The reading stop point for the sound buffer memory 23 is set at the center of the sound buffer memory 23, but it is not limited to this point.

The jog mode start point can be set in the middle of the section Wb.

The mode switching is explained on switching from the FF mode to the jog mode in this example, but the reading control method in FIG. 12 can apply also to the switching from a rewind mode to the jog mode, or from the FF mode to the shuttle mode or even to the high-speed shuttle mode (16× speed mode, for example).

According to the above mentioned second control method, as sound is generated at a variable speed using the sound buffer memory at switching from the high-speed running mode to the variable-speed memory reproduction, an analog sound recording and reproducing head is not required and cost can be reduced.

By generating sound at a variable speed at switching from the high-speed running mode to the variable-speed memory reproduction, operability feeling close to that of an analog sound recording and reproducing device can be realized, and operability can be drastically improved.

In each of the above mentioned preferred embodiments, the variable-speed continuous reproduction both in the forward and the reverse directions at the speed of turning the jog dial is realized using the sound buffer memory 23, and this use of memory can be also applied to the normal 1× speed reproduction.

In this case, writing onto the sound buffer memory 23 is done at 2× speed. The sounds before and after the sound read out at 1× speed has been already written on the sound buffer memory 23. Thus, even after switching to the jog mode, jog sound can be generated immediately.

As writing is performed at 2× speed, reproduction from the sound buffer memory 23 can be made at the same time as start of the 1× speed reproduction. In case of reproduction without using the sound buffer memory 23, jog reproduction is not possible till sound data has been written enough on the sound buffer memory 23 after switching to the jog mode.

Even if the sound buffer memory 23 is used, with the method of writing synchronously with reproduction, reading is done at 1× speed while writing at 1× speed. Thus, it is difficult to generate sound at the same time as start of 1× speed reproduction, or it is difficult to generate sound immediately after switching to the jog mode. It is especially difficult for equipment with a tape transport such as DAT.

Writing onto the sound buffer memory 23 is at 2× speed, and writing precedes memory reproduction. Therefore, even if a data error should occur during reproduction from the tape due to momentary clog, etc., there is time allowance to detect the error and to reproduce that part again. This error-correction processing can improve reliability at reproduction. The range of errors that can be corrected depends on the capacity of the sound buffer memory 23 and the writing speed.

Reading from the sound buffer memory 23 is controlled so that it is slowed in the non-linear curve state as the curve 95, but it can be slowed in the linear state as a straight line 96.

In the above mentioned preferred embodiments, a cassette video tape is used as a medium on which sound is recorded, but other media including a disk, for example, can also be used, not limited to the preferred embodiments. In that case, a pick-up for reading data can be an optical pick-up, and the capstan motor can also be replaced, if the positions of the pick-up for reading data and the medium on which sound is recorded are relatively moved.

The jog dial 17 is used for controlling the reading speed from the sound buffer memory 23, but it can be replaced by keys, and then, the counter is not necessarily required but information on speed or position can be sent by the micro processor 36 or a decoder circuit which can take its place.

The write address onto the sound buffer memory 23 is generated by the write address generation circuit 22 and the micro processor 36 due to the convenience of hardware of the decoder 31, but not limited to this, the address can be made by software including the read address generation circuit 41.

The difference between the write address and the read address for the sound buffer memory is calculated by the micro processor 36, but it can be also constituted by hardware.

The servo circuit 42 and a capstan motor drive circuit 18 are used to operate the video tape 13 by the capstan motor, not limited to this, a control circuit can be used if it can relatively move positions of the pick-up system for reading data and the medium on which sound is recorded.

The DSP 32 is used to gain high quality variable-speed reproduction sound, but if interpolation is not necessary, it can be omitted. The D/A converter 33 is used to achieve audibility of variable-speed reproduction sound, but it is not necessary if the level of the variable-speed reproduction sound is made into a graph on a display device, etc.

INDUSTRIAL APPLICABILITY

As mentioned above, the digital sound reproducing device of the present invention is not only used as a professional use integral or separate editing device using a plurality of digital sound recording and reproducing devices as R-DAT, but also suitable to be used as a normal digital sound reproducing machine.

We claim:

1. A digital sound editing device comprising:
digital sound reproducing device used as a sound editing player including:
sound reproducing means,
a sound buffer memory for storing sound data reproduced from a recording medium,
operating means for controlling a reading speed from the sound buffer memory,
a signal processing circuit for reading the sound data from the sound buffer memory at a speed corresponding to an operating state of the operating means and for reproducing the sound data from the recording medium asynchronously with the operating state of the operating means so as to write the sound data into the sound buffer memory, means for detecting a difference between a reading position and a writing position of the sound buffer memory, means for controlling a reproduction state of the sound data from the recording medium according to the difference detected by the means for detecting, means for providing a non-sensitive zone before and after a reading point of the sound buffer memory, so as to include the reading point, wherein the non-sensitive zone corresponds to an area of the sound buffer memory for which the data pick-up system does not move and for which a position of the recording medium relative to the data pick-up system does not change, and means for controlling a relative position of the recording medium so that the data pick-up system moves only to maintain the reading point within the non-sensitive zone;

a sound editing recorder; and means for recording sound data with fixed editing points output from the digital sound reproducing device in the sound editing recorder.

2. The digital editing device according to claim 1, wherein the digital sound reproducing device and the sound editing recorder each includes a rotating digital audio tape recorder.

3. The digital sound editing device according to claim 1, wherein the digital sound reproducing device further comprises means for detecting and using time information from a reproduction subcode for address control of reading and writing of the sound data into the sound buffer memory and for relative position control of the recording medium on which the sound data is recorded and a data pick-up system, and wherein the reproduction subcode is included in the sound data reproduced from the recording medium.

4. The digital sound editing device according to claim 1, wherein the digital sound reproducing device further comprises means for determining a speed of reproducing the sound data from the recording medium by controlling a relative position of the recording medium and a sound data pick-up system.

5. The digital sound editing device according to claim 1, wherein the digital sound reproducing device further comprises:

means for reproducing the sound data at a speed higher than a 1× normal reproduction speed before switching from the high-speed running mode to a variable-speed memory reproduction mode, wherein the high-speed running mode corresponds to a speed greater than the 1× normal reproduction speed;

means for writing the sound data into the sound buffer memory; and means for reading the sound data from the sound buffer memory at a speed less than a data writing speed of the means for writing.

6. The digital sound editing device according to claim 5, wherein the digital sound reproducing device further comprises means for non-linearly controlling the reading speed of the sound data from the sound buffer memory within a variable speed ranging from a 2× speed to a stop speed.

7. The digital sound editing device according to claim 5, wherein the digital sound reproducing device further comprises means for linearly controlling the reading speed of the sound data from the sound buffer memory within a variable speed ranging from a 2× speed to a stop speed.

* * * * *